United States Patent [19]
Vance

[11] 3,956,472
[45] May 11, 1976

[54] REMOVAL OF BORON FROM MAGNESIUM CHLORIDE BRINES

[75] Inventor: Gary R. Vance, East Windsor, N.J.

[73] Assignee: N L Industries, Inc., New York, N.Y.

[22] Filed: Apr. 3, 1975

[21] Appl. No.: 564,740

[52] U.S. Cl. .............................. 423/497; 423/157; 423/158; 423/472
[51] Int. Cl.² ............................................ C01F 5/30
[58] Field of Search ........... 423/497, 472, 499, 157, 423/158

[56] References Cited
UNITED STATES PATENTS

| | | | |
|---|---|---|---|
| 2,402,959 | 7/1946 | Gustafson et al. | 423/497 X |
| 3,178,261 | 4/1965 | Lewis et al. | 423/472 X |

*Primary Examiner*—Edward Stern

[57] ABSTRACT

Minute amounts of boron present in naturally occurring brines found in oceans, inland seas, salt lake and the like are removed by treating the brine with a fluoride ion.

5 Claims, No Drawings

REMOVAL OF BORON FROM MAGNESIUM CHLORIDE BRINES

BACKGROUND OF INVENTION

Molten substantially anhydrous magnesium chloride is a widely used electrolyte for the production of electrolytic magnesium metal; and is commonly derived from brine concentrates comprising essentially magnesium chloride a typical process for producing these brine concentrates from naturally occurring brines being disclosed in U.S. Pat. No. 3,516,785 and included by reference. In brief, these brine concentrates are produced by subjecting naturally occurring brines to solar evaporation in a series of stages to form what is commonly referred to as a holding pond brine; and thereafter concentrating the holding pond brine in one or more stages to produce a brine concentrate consisting essentially of magnesium chloride, water and trace amounts of other metals and/or metal oxides including boron. This brine concentrate is then dehydrated, preferably by spray drying, and the substantially dry product melted to form a molten electrolyte.

Now it is well known that when a magnesium chloride electrolyte prepared from a brine concentrate and containing boron or a boron compound in proportions equivalent to as little as from 15 to 60 ppm boron is electrolyzed the magnesium metal does not coalesce readily but tends to form as discrete globules dispersed in the cell melt with the result that cell current efficiencies are lowered and significant amounts of magnesium metal end up in the cell smut.

It is important therefore to production of magnesium metal on plant scale that the magnesium chloride electrolyte be substantially free of boron or that the level of boron in the electrolyte be reduced sufficiently that its adverse affects on the coalescence of the magnesium metal and cell efficiencies be minimized.

Known methods for producing magnesium chloride electrolytes having low levels of boron include chlorination of the spray dried magnesium chloride concentrate either during melting of the spray dried material or subsequent thereto. However, removal of boron by chlorination is a slow and expensive process requiring long contact times in the melt cells and/or chlorinators, and the handling of large volumes of gaseous chlorine. As a result melt cell life is seriously shortened and catastrophic feeding and corrosion problems develope.

It is also known to reduce the level of boron in magnesium chloride electrolytes by extracting the boron from a magnesium chloride brine prior to forming the anhydrous cell feed material using liquid-liquid extraction techniques as described, for example, in patents Br No. 1354944, U.S. Pat. No. 3,483,349, and U.S. Pat. No. 3,433,604 wherein extraction of the boron is effected by means of an organic extractant. However, these and other known processes for reducing the level of boron in magnesium chloride brines are prohibitively expensive on a commercial plant scale due to large losses of costly organic additives; or the elaborate and expensive regeneration techniques required to reclaim these additives.

It is desirable therefore, in the interest of the efficient electrolytic production of magnesium metal from salt brines on a commercial scale to provide a relatively simple, inexpensive method and means for forming substantially boron-free magnesium chloride electrolytes from naturally occurring brines consistent with the overall economy of the process.

SUMMARY OF INVENTION

In its broadest aspects the present invention relates to treatment of naturally occurring brines derived from Great Salt Lake brines, and in partaicular holding pond brines derived therefrom so that the level of boron in the brine is reduced sufficiently, prior to concentration and spray drying, that the necessity for chlorinating the spray dried material to remove boron is eliminated or at least minimized sufficiently to obviate the high costs and catastrophic problems attending present chlorination methods. More particularly, it has been found that these objectives can be achieved by reducing the level of boron in holding pond brines to at least as low as 100 ppm and preferably less than 50 ppm efficiently by the addition of fluoride ions the invention having its conception in the discovery that when fluoride ions are introduced into a holding pond brine a relatively insoluble complex salt is formed which can be separated from the residual brine by simple settling techniques. More particularly, it has been found that by adding hydrogen fluoride to a holding pond brine, preferably in excess of stoichiometry, i.e. in ratio of boron to F of about 1:10 a relatively insoluble salt is formed which unexpectedly is a complex salt of potassium, boron and fluorine and not magnesium fluoride as one would expect. This complex salt, has been analyzed as comprising essentially potassium tetrafluoborate ($KBF_4$) and is readily separated and removed from the brine by a simple settling method carried out at ambient temperatures. The boron values in the supernate are as low as 55 ppm after 12 hours and only about 20 ppm after 44 hours the settling times being commensurate with large scale plant operations.

In this connection it has been found essential to precipitation of the insoluble complex salt of potassium tetrafluoborate that the pH of the brine solution be less than about 1. Normally the addition of the HF will suffice to bring the pH to this level. However if not then it is preferred to add an acid such as HCl, thus avoiding the use of hydrogen fluoride in amounts in excess of the required to form the complex salt.

Following separation and removal of the complex fluoride salt the pH of the magnesium chloride supernate is adjusted from 4 to 6 by the addition of a neutralizing agent, as for example magnesium oxide, after which the magnesium chloride brine, now substantially free of boron, is concentrated, spray dried and melted according to known procedures to form a magnesium chloride feed material in which the level of boron is sufficiently low as to have no adverse affect on the coalescence of the molten magnesium metal in the cell melt.

The complex potassium tetrafluoborate salt composition recovered from the brine is useful for solder flux, electrolytic brightening of aluminum and as a binder and cooling agent in abrasive wheels.

PREFERRED EMBODIMENT OF THE INVENTION

The process of this invention is preferably carried out in three stages namely a reaction stage, a settling stage and a pH adjusting stage.

The reaction stage is characterized by feeding a holding pond brine, which may analyze about 6 to 8% magnesium about 0.3 to 0.5% potassium, about 3.0% $SO_4$, from 400 to 550 ppm boron and trace amounts of lithium and calcium, to a reaction tank to which is added a solution of hydrogen fluoride (48–50% HF) at a loading of from about 0.70 to 1.5% on brine weight basis, and with continuous agitation for from 0.75 to 2 hours to form an insoluble potassium tetrafluoborate salt. During agitation the temperature of the brine-hydrogen fluoride mix should be maintained between 0° and about 50°C for acceptable removal of boron as an insoluble complex salt of potassium tetrafluoborate, optimum removals of boron occurring at low temperatures of from ambient temperature to 25°C.

Following first stage treatment of the brine the latter is fed into a settling tank or a lagoon, as the case may be, and the pH of the brine checked and adjusted, if necessary, by the addition of hydrochloric or equivalent acid, to a pH preferably less than 1 after which the brine is allowed to remain substantially quiescent for from 1 to 7 days. During this period the insoluble potassium tetrafluoborate that formed in the reaction tank settles slowly into the bottom of the lagoon from which it may be subsequently recovered.

Following the settling period, which is considered to be terminated when substantially all of the complex salt has precipitated out of the brine, the supernate is discharged into a treatment tank in which the pH of the brine is raised to from 4 to 5 by the addition of a suitable neutralizing agent. This is done in the interest of protecting plant equipment during subsequent processing of the brine that is to say desulfating, carnalliting, concentrating and so forth. Moreover it is essential that the neutralizing agent used not introduce contaminants into the magnesium chloride brine. In this connection it has been found that magnesium oxide dissolves in the brine to form a clear magnesium chloride solution. In this respect the addition of the magnesium oxide may be regarded as a credit in the boron removal system.

Using the foregoing process it has been found possible to remove from 75 to 85% of the boron from a holding pond brine by the addition of about 1.0% hydrogen fluoride (49% solution) at temperatures in the range from ambient temperature to 25°C, these percentages being equivalent to a brine having no more than about 50 parts per million boron.

Following removal of the boron the substantially boron-free brine may then be processed according to the disclosure in U.S. Pat. No. 3,516,785 supra wherein the deboronated brine is desulfated by treatment with calcium chloride to form and precipitate kainite and then decarnallited and spray dried or the deboronated brine may be treated first to remove kainite and thereafter desulfated, as the case may be.

The invention is illustrated further by the following examples:

EXAMPLE I 353 gallons (3870 pounds) holding pond brine analyzing about 7.24% Mg, 0.47% K, 3.04% $SO_4$, 0.32% $CO_3$ and about 460 ppm boron were fed to a reaction tank to which was added about 39 lbs. of hydrogen fluoride, as an aqueous solution of about 48% HF. The pH of the mix was less than 1. The mix was agitated continuously for about 45 minutes during which period the temperature of the mix was maintained at about 15°C. Thereafter the brine, which now contained a complex insoluble potassium tetrafluoborate salt, was fed to a settling tank in which the brine was maintained quiescent for 24 hours. During this period the complex salt settled out of the brine.

The salt-free brine or supernate in an amount of 254 gallons was then fed into a third tank in which the pH of the brine was adjusted to about 4 by adding about 6.3 lbs. of MgO.

The pH-adjusted supernate analyzed about 6.02% Mg, and about 87 ppm boron.

EXAMPLE II

The procedure of Example II was repeated using the same brine. To 300 gallons (3290 lbs) of this brine were added about 33 pounds HF (48% sol.) equivalent to about 25% excess of stoichinetric and about 1% on brine weight basis; and about 3 pounds of 37.5% sol. of HCl or about 0.1% on brine weight basis. The pH of the mix was less than 1 and was agitated continuously for about 2 hours. Thereafter the mix was transferred to a settling lagoon and allowed to remain quiescent for 7 days. During this time the complex salt settled out leaving a substantially salt-free supernatant brine the pH of which was adjusted to about 4 by the addition of MgO. The supernatant brine contained only about 15 ppm boron.

EXAMPLE III

A third run was made using a holding pond brine which had been desulfated according to the procedure disclosed in U.S. 3,516,785 the amount of sulphur present being only about 0.16% as $SO_4$. To 300 gals. of this brine was added 25 lbs. HF (48.5% sol.) equivalent to about 0.75% brine weight basis. The pH of the mix was less than 1 and the mix was agitated continuously for about 1 hour at the end of which the mix was allowed to remain quiescent for four (4) days during which time the complex salt settled out leaving a brine containing less than 50 ppm boron. The supernatant brine was then neutralized by the addition of MgO, as in Example I, to prepare the solution for further processing in the plant.

I claim:

1. Method for removing boron from naturally occurring $MgCl_2$ brines consisting essentially of from 6–8% Mg, from 400 to 500 ppm boron and lesser amounts of metal salts including potassium by liquid-liquid extraction comprising: introducing a fluoride ion into said brine by adding an aqueous solution of hydrogen fluoride thereto, reacting said fluoride ion with said brine for a predetermined period of time to form an insoluble potassium tetrafluoborate salt in said brine and adjusting the brine to a pH less than about 1 to effectively settle out the insoluble salt from the substantially boron-free brine.

2. Method for removing boron from naturally occurring brines according to claim 1 wherein an acid is added to said brine to adjust the pH to less than about 1.

3. Method for removing boron from naturally occurring brines according to claim 1 wherein the hydrogen fluoride treated brine is maintained quiescent for from 1 to 7 days to allow the insoluble potassium tetrafluoborate salt to settle out.

4. Method for removing boron from naturally occurring brines according to claim 1 wherein a neutralizing agent is added to the substantially boron-free brine to adjust its pH in range from 4 to 6.

5. Method for removing boron from naturally occurring brines according to claim 4 wherein said neutralizing agent is MgO.

* * * * *